United States Patent [19]

Marsden

[11] Patent Number: 4,622,756
[45] Date of Patent: Nov. 18, 1986

[54] PROFILE CHECKING APPARATUS

[75] Inventor: Reginald G. Marsden, Crewe, England

[73] Assignee: Rolls Royce Motors Limited, Crewe, England

[21] Appl. No.: 654,541

[22] Filed: Sep. 26, 1984

[30] Foreign Application Priority Data

Oct. 1, 1983 [GB] United Kingdom ............... 8326343

[51] Int. Cl.⁴ .................................... F01B 21/20
[52] U.S. Cl. .................................. 33/556; 33/551
[58] Field of Search .......... 33/553, 554, 519, 180 AT, 33/181 AT, 572, 573, 548, 550, 558, 561, 551, 533, 556

[56] References Cited

U.S. PATENT DOCUMENTS

| | | | |
|---|---|---|---|
| 2,504,961 | 4/1950 | Braaten | 33/572 X |
| 2,623,293 | 12/1952 | Nebesar | 33/519 |
| 3,481,043 | 12/1969 | Esch | 33/556 X |
| 3,755,907 | 9/1973 | Kreiensen | 33/519 |
| 3,791,039 | 2/1974 | Allix | 33/573 |
| 3,899,664 | 8/1975 | Bencini | 33/519 X |

FOREIGN PATENT DOCUMENTS

| | | | |
|---|---|---|---|
| 1548253 | 9/1969 | Fed. Rep. of Germany | 33/553 |
| 3123489 | 12/1982 | Fed. Rep. of Germany | 33/174 L |
| 887651 | 8/1943 | France | 33/561 |
| 0055805 | 5/1981 | Japan | 33/550 |
| 939987 | 10/1963 | United Kingdom . | |
| 1476520 | 6/1977 | United Kingdom . | |
| 2038484 | 7/1980 | United Kingdom . | |
| 2058354 | 4/1981 | United Kingdom . | |
| 2062871 | 5/1981 | United Kingdom . | |
| 2080535 | 2/1982 | United Kingdom . | |
| 2107874 | 5/1983 | United Kingdom . | |
| 2136128 | 9/1984 | United Kingdom . | |

*Primary Examiner*—Harry N. Haroian
*Attorney, Agent, or Firm*—Cushman, Darby & Cushman

[57] ABSTRACT

A cam profile checking apparatus comprises a motor for rotating the cam and a transducer for measuring the lift of the cam as it continuously rotates with respect to a reference point. Signals from the transducer are processed in a programmed computer and plots of the cam profile, cam lift, velocity and acceleration produced by a plotter connected to the computer. By using existing data a cam error plot can also be produced. This provides relatively simple and economic apparatus and method.

14 Claims, 3 Drawing Figures

PROFILE CHECKING APPARATUS

The present invention relates to a method of and apparatus for checking the profile of an element.

The method and apparatus has particularly, but not exclusive, application to the checking of the profiles of the cams of a camshaft. At the present time, this checking is carried out either manually, which is a tedious repetitive and time consuming operation, or automatically with complex and expensive equipment. This equipment comprises stepping motors for turning the shaft angularly through predetermined angular steps and taking measurements at each step.

According to one aspect of the present invention there is provided a method of checking the profile of an element including the steps of advancing a detection head up to the element, determining a reference point on the profile, producing continuous relative movement between the detection head and the element continuously taking profile readings from the reference along the profile and feeding these readings at selected spaced intervals to a computer for subsequent manipulation.

According to another aspect of the present invention, there is provided apparatus for checking the profile of an element comprising a support, a transducer for producing a signal in dependence upon the position of the profile, a drive associated with the support for producing continuous relative movement between an element being checked and the transducer and means for feeding signals from the transducer to a computer for subsequent manipulation.

In order that the invention may be more clearly understood, one embodiment of the invention will now be described by way of example with reference to the accompanying drawings, in which.

Figure 1:
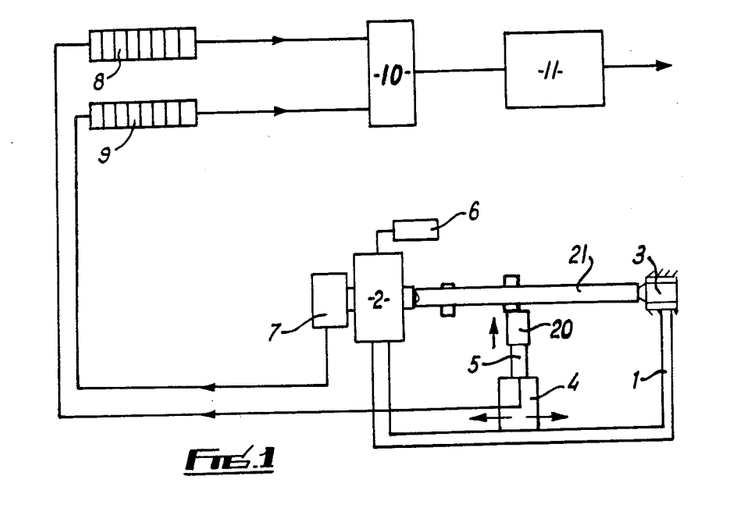
FIG. 1 is a diagrammatic view of a camshaft measuring apparatus.

Referring to FIG. 1, the apparatus comprises a rigid, straight and flat base 1 upon which is mounted a headstock 2, a tailstock 3 and carriage 4 for a lift measuring transducers. The tailstock 3 is movable to accommodate camshafts of different lengths and the headstock 2 incorporates a motor drive 6 for rotation. A high resolution rotary encoder 7 records angular displacement in steps of 0.001° and cam lift is measured with the aid of a 30 mm displacement transducer having a resolution of 1 micron. The camshaft to be checked is mounted between centres and a steady is used on the journals to correct any sag or eccentricity. A cam follower, which may be the flat type or spherical as required, is disposed between the cam and the transducer 5. Measuring pressure is maintained constant during the measuring process.

The transducer 5 and rotary encoder 7 are connected, via respective digital readout devices 8 and 9 and an interface 10 to a central processing unit 11. Device 8 provides a continuous digital readout of the lift measured by transducer 5 and device 9 a continuous digital readout of the angle measured by the rotary encoder 7. The interfaces 10 match the outputs from the devices 8 and 9 to the I/O interface of the central processing unit.

Unit 11 is a microcomputer and is provided with peripheral equipment which includes a dual disc-drive memory module, a dot matrix printer and A3 8-pen plotter.

The above described apparatus is used in the following manner. With the camshaft to be checked mounted between centres of the headstock 2 and tailstock 3 and drive coupling attached the cam journals are checked for any eccentricity and a steady is fitted as required. The cam follower, referenced 20 in FIG. 1, is then adjusted on the cam form referenced 21 on FIG. 1 (in this case a flat follower is set normal to the cam face.) The cam peak is then estimated by finding the reversal point of the lift and then using this figure, lift is recorded 30° on either side. (For this particular cam, the profile is symmetrical for 32° either side of the peak.) The true position of the cam peak is then found by subtracting the difference in lift at these points and winding the cam 21 to the required lift value noting the angular change on device 9. The true value for the peak is then entered into the computer and the motor drive 6 started. The measured values for angle and lift are displayed on a V.D.U. associated with the computer at 1 degree intervals for the full 360° of rotation. Both disc-drives are used during measurement, programmes being retained on one drive unit and measured data stored on the other. The software programme controls the data collection sequence and after one full revolution of the cam, re-adjusts the measured data to put the cam peak at zero degrees.

The software programme which is shown at the end of the specification has been written so that it is user friendly and does not require any specialist computer knowledge. Simple questions are displayed on the screen such as "Is the measurement to be a new one or a plot of existing data?" Options are then provided by using the special function keys to produce the following.

(i) Profile, velocity and acceleration diagrams of cam form.
(ii) Error plot of cam form—deviations from a straight line and errors depicted over camshaft sectional view.
(iii) An A4 size view of cam with errors plotted over nominal shape.
(iv) Angular error results printed for one camshaft the (camshaft for the present embodiment has 16 cam lobes.)
(v) Printout of measured cam data at one degree increments.
(vi) Continuation key to start the measurement sequence again.
(vii) Plot showing all cam errors in the form of deviations from a straight line, plotted on one A3 size sheet of paper.

Figure 2:
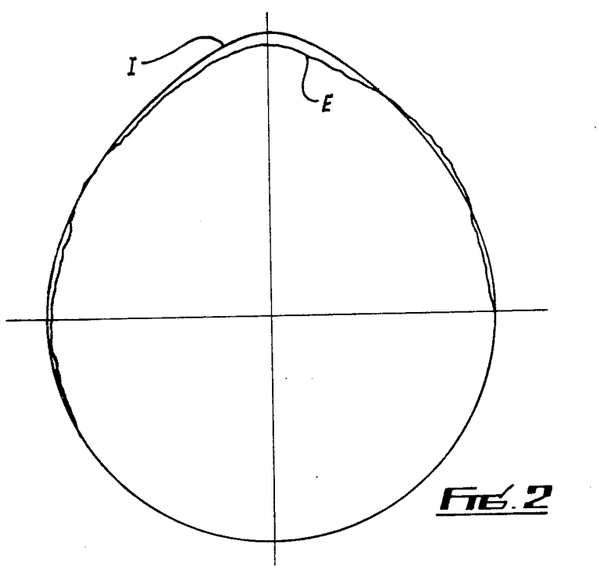
FIG. 2 shows a plot of the ideal profile of the cam and of the profile error of the actual cam obtained using the apparatus of FIG. 1.

FIG. 2 shows an error plot of the cam greatly magnified together with a plot of the ideal cam profile. The ideal profile is referenced I and the Error plot is referenced E.

Figure 3:
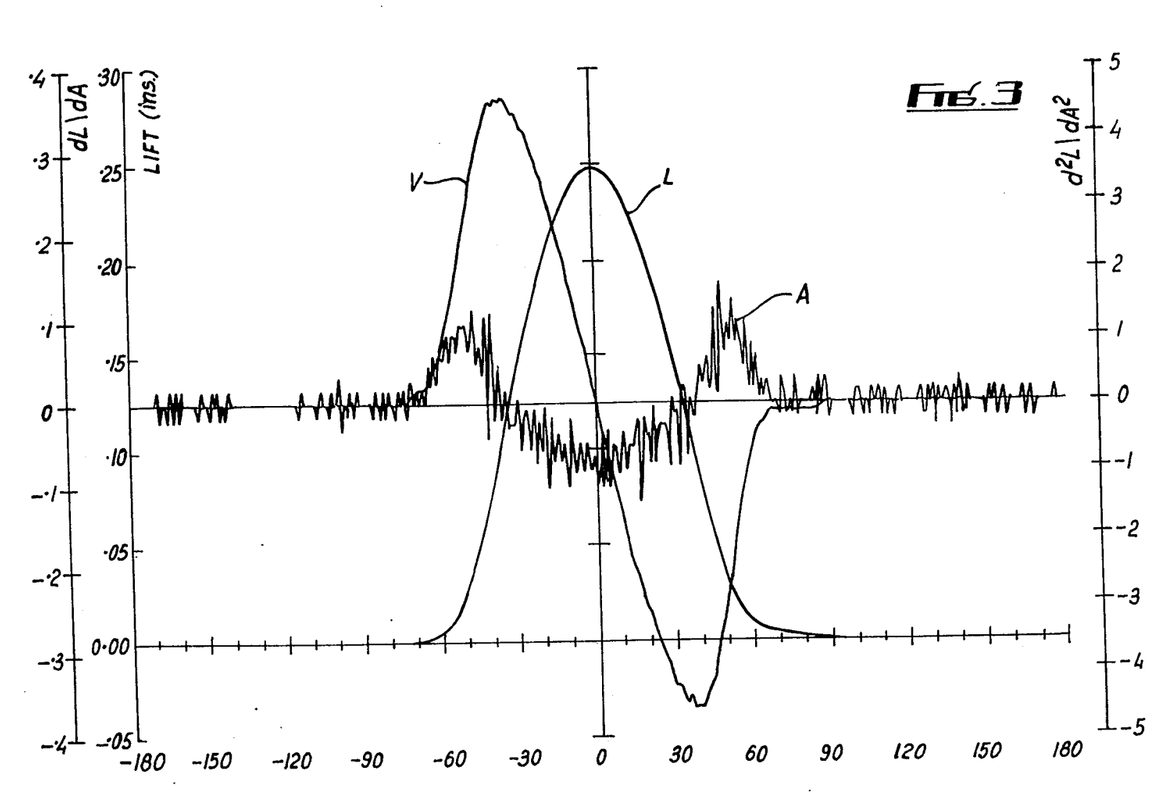
FIG. 3 shows an acceleration and velocity plot for the cam of the profile error of which is shown in FIG. 2.

FIG. 3 shows a plot of the lift, velocity and acceleration diagrams of the cam. These are respectively referenced L, V and A.

The data collection operation takes 10 minutes and then after re-adjustment to format the peak at zero degrees the error plot may be drawn on the V.D.U. screen. Upon pressing the 'continue' key the data is stored on disc and then the options via the special function keys appear as already described above. Numerical differentiation of the measured cam lift value may be carried out to produce velocity and acceleration data. These results together with the cam profile are then plotted on A3 cartridge type paper using 4 different pen colours. The plots are fully labeled with the angular scale marked from −180 to +180 degrees and the lift from −0.05″ to 0.30″. The plots can be produced for any camshaft without reference to any known data, the only limiting factor being maximum value of lift which is programmed to be 0.3″ but this can be easily changed if required.

The error plot of cam form (also on A3 paper) is fully labelled and uses four different pen colours. This routine makes use of camshaft drawing data already stored in the machine. Errors are shown as deviations from a straight line but a section view showing the greatly magnified error is also plotted on the left-hand side of the paper.

It will be appreciated that after initially establishing the cam peak, the shaft is rotated continuously and the measured data (lift and angle) is sent simultaneously and continuously to the central processing unit 11. The measured signals from both the angles and lift transducers are sent whether the cam is rotating or static. The software programme reads the values and determines whether to accept or reject dependant upon the tolerances set in the programme. The data accepted by the computer is stored for later manipulation and calculation before being outputted to the peripheral devices.

This method of data acquisition permits a simpler and therefore less expensive arrangement as compared with machines which make use of stepping motors and control circuits between the central processing unit and the camshaft driving device.

Software programme

```
10 REM *CAM PLOT*
20 PRINTER IS 701,80 @ PLOTTER IS 1 @ SETGU
30 DEG
40 MASS STORAGE IS ":D700"
50 CLEAR
60 DISP "   CAMSHAFT MEASUREMENT PROGRAM" @ DISP
65 DISP "BEFORE RUNNING PROGRAM NOTE THAT PROGRAMS ARE TO BE INSERTED VIA DISC D
RIVE 0   AND DATA FILES ARE ON DISC DRIVE 1"
70 OPTION BASE 1
80 COM L5(360),N,R$[10] ,INTEGER A2(360)
90 LDIR 0 @ X=0
95 REAL AN(8)
100 DIM L(361),L1(361),L2(361),A$[8],L$[8],L3(361),L4(360),LF1(90),LF2(90),LF3(9
0),LF4(90),X(361),Y(361),X2(361),Y2(361),C(16),K1$(16)[10],K$(16)[5],C$(16)[10]
110 INTEGER A1(361),A(361),AN1(90),AN2(90),AN3(90),AN4(90)
120 ASSIGN£ 2 TO   "UE 30467"
130 FOR I=1 TO 360
140 READ£ 2 ; A2(I),L5(I)
150 NEXT I
160 READ£ 2,361 ; L$
170 ASSIGN£ 2 TO   *
171 ASSIGN£ 1 TO   "CAM"
172 FOR I=1 TO 361
173 READ£ 1 ; X(I),Y(I)
174 NEXT I
175 ASSIGN£ 1 TO   *
180 DISP "IS THIS TO BE A NEW MEASUREMENT? IF IT IS THEN TYPE YES OR NO (Y OR N
"
190 INPUT F$
200 IF F$="N" THEN 1250
205 MASS STORAGE IS ":D701"
210 DISP "ENTER NAME AND NUMBER OF CAM (to be no more than ten characters long
"
220 INPUT G$
230 DISP "PROFILE OF ";G$
235 DISP "ZERO LIFT READOUT ON  BASE CIRCLE OF CAM AND ZERO PRESET OF ANGLE" @ B
EEP @ BEEP
240 DISP "FIND POSITION OF MAX. CAM LIFT BY MEASURING DISPLACEMENT 30 DEG EITHER
  SIDE OF PEAK"
250 DISP "TYPE IN THIS ANGLE"
260 INPUT M$
270 DISP "THEN TURN CAM UNTIL THIS READING IS OBTAINED AT MAX LIFT AND ZERO ANG
LAR READOUT"
280 ENTER 4 ; AN,L
290 IF AN=0 THEN 310
300 GOTO 280
310 BEEP
320 A(1)=0
330 L(1)=L/100000
340 DISP "ENTER ";360-VAL (M$);"INTO PRESET
```

```
350 DISP "START MOTOR DRIVE"
360 DISP A(1);L(1)
370 ENTER 4 ; A$,L$
380 S=VAL (A$[6,8])
390 IF S>= 980 THEN 430
400 IF S<= 20 THEN 420
410 GOTO 370
420 R=INT (VAL (A$)/1000) @ GOTO 440
430 R=INT (VAL (A$)/1000)+1
440 IF X=R THEN 370
450 X=R @ A(X+1)=R
460 L(X+1)=VAL (L$)/100000*-1
470 BEEP
480 DISP VAL (A$)/1000;L(X+1);X
490 IF X=360 THEN 500 ELSE 370
500 FOR I=1 TO 360
510 A1(I)=A(I)
520 IF A1(I)=180 THEN 540
530 NEXT I
540 FOR J=1 TO 360
550 A1(J)=A(180+J)-360 @ L1(J)=L(180+J)
560 IF A1(J)=-1 THEN 580
570 NEXT J
580 FOR I=181 TO 360
590 A1(I)=A(I-180) @ L1(I)=L(I-180)
600 IF A1(I)=179 THEN 620
610 NEXT I
620 DISP "CORRECTED READINGS"
630 FOR J=1 TO 360
640 DISP A1(J);L1(J)
650 NEXT J
655 ENTER 4 ; AN,L
660 DISP "CALCULATING PLEASE WAIT"
670 FOR I=1 TO 360
680 L4(I)=L1(I)-L5(I)
690 NEXT I
700 GCLEAR @ PLOTTER IS 1
710 LOCATE 20,146,5,95
720 FXD 0,3
730 SCALE -180,180,-.005,.005
740 LAXES -30,.001,0,0,3,1
750 FOR I=1 TO 360
760 PLOT A2(I),L4(I) @ NEXT I
770 LORG 4
780 MOVE 0,.005 @ LABEL "ERROR PROFILE PLOT (";G$;")"
790 LORG 1
800 MOVE 10,.003 @ LABEL "PRESS CONT TO CONTINUE"
810 PAUSE
820 MASS STORAGE IS ":D701"
870 CREATE G$,361,17
880 ASSIGN£ 1 TO G$
890 FOR I=1 TO 360
900 PRINT£ 1 ; A1(I),L1(I)
910 NEXT I
920 PRINT£ 1,361 ; M$
930 ASSIGN£ 1 TO *
940 DISP "FILE";G$;"LOADED"
950 BEEP
951 DISP "DO YOU WANT THIS RESULT PLOTTED ON PRINTER?"
952 DISP "ENTER Y OR N"
953 INPUT P$
954 IF P$="N" THEN 960
955 DUMP GRAPHICS -.0055,.0055,0,-1
960 D=2*PI /360
970 CLEAR @ GOTO 980
980 ON KEY£ 1,"HELP" GOSUB 1640
990 ON KEY£ 2,"P.V.A.PLT" GOSUB 1080
1000 ON KEY£ 3,"CAM ERR" GOSUB 1340
1010 ON KEY£ 4,"ALL ERR" GOSUB 1750
1020 ON KEY£ 5,"PRT RESULT" GOSUB 2610
1030 ON KEY£ 6,"ERR PLT" GOSUB 2180
1040 ON KEY£ 7,"ANGLE ERR" GOSUB 5000
```

```
1050 ON KEY£ 8,"END" GOSUB 7000
1055 ON KEY£ 14,"CONTINUE" GOSUB 180
1060 KEY LABEL @ DISP "SELECT OPTION"
1070 GOTO 1070
1080 GCLEAR @ PLOTTER IS 705 @ FRAME @ CSIZE 3
1090 LOCATE 20,130,10,90
1100 SCALE -180,180,-.05,.3
1110 FXD 0,2
1120 LAXES -10,.05,0,0,3,1
1130 LDIR 0 @ LORG 4 @ CSIZE 4
1140 MOVE 0,.31 @ LABEL G$&"  PROFILE PLOT"
1150 YAXIS -180,.05,-.05,.3 @ LDIR 90 @ CSIZE 3
1160 MOVE -165,.275 @ LABEL "LIFT (ins)"
1170 PEN 2 @ LDIR 0
1180 FOR I=1 TO 360
1190 PLOT A1(I),L1(I)
1200 NEXT I
1210 PEN UP @ PEN 0
1220 GOTO 1800
1250 DISP "TYPE IN NAME OF FILE TO BE USED"
1260 INPUT G$
1265 MASS STORAGE IS ":D701"
1270 ASSIGN£ 1 TO G$
1280 FOR I=1 TO 360
1290 READ£ 1 ; A1(I),L1(I)
1300 NEXT I
1310 READ£ 1,361 ; M$
1320 ASSIGN£ 1 TO  *
1330 GOTO 960
1340 GCLEAR @ PLOTTER IS 705 @ BEEP
1350 DISP "PLEASE CHANGE PLOTTING PAPER TO A4 SIZE"
1360 DISP "LOCATE IN BOTTOM LEFTHAND CORNER"
1370 DISP "PRESS CONT WHEN READY"
1380 PAUSE
1385 GCLEAR @ DISP "CALCULATING"
1390 FOR I=0 TO 359
1410 X2(I+1)=X(I+1)+(1500*(-L1(I+1)+L5(I+1)))*SIN (I) @ Y2(I+1)=Y(I+1)+(1500*(-
1(I+1)+L5(I+1)))*COS (I)
1420 NEXT I
1430 X2(361)=X2(1) @ Y2(361)=Y2(1)
1435 GCLEAR @ BEEP @ BEEP @ DISP "PLOTTING"
1450 LIMIT 0,277,5,195
1460 SHOW -50,50,-50,50
1470 FRAME
1480 PEN 2
1485 MOVE -40,0 @ DRAW 40,0 @ MOVE 0,-40 @ DRAW 0,40
1486 PEN UP
1490 FOR I=1 TO 361
1500 PLOT X(I),Y(I)
1510 NEXT I
1520 PEN UP @ PEN 4
1530 FOR I=1 TO 361
1540 PLOT X2(I),Y2(I)
1550 NEXT I
1560 PEN UP @ PEN 1
1580 LORG 4 @ CSIZE 6
1590 MOVE 0,40
1600 LABEL "ERROR PLOT OF ";G$ @ CSIZE 4
1610 MOVE -40,0 @ LABEL "OPENING"
1615 LABEL "RAMP" @ MOVE 40,0 @ LABEL "CLOSING " @ LABEL "RAMP" @ LIMIT 12,392.9
,259
1620 PEN 0
1630 GOTO 970
1640 CLEAR @ KEY LABEL @ DISP "   CAMSHAFT MEASUREMENT PROGRAM"
1650 DISP
1660 DISP "PRESS KEY K1 FOR HELP"
1670 DISP "PRESS KEY K2 FOR PROFILE,VELOCITY AND ACCELERATION DIAGRAMS"
1680 DISP "PRESS KEY K3 FOR CAM FORM ERROR PLOTTED OVER THEORETICAL FORM"
1690 DISP "PRESS KEY K4 FOR PLOT OF ALL CAM ERRORS /ANGLE ON 1 PLOT"
1700 DISP "PRESS KEY K5 FOR PRINTED RESULT"
1710 DISP "PRESS KEY K6 FOR ERROR PLOT OF PROFILE"
1720 DISP "PRESS KEY K7 FOR ANGULAR ERROR RELATIONSHIPS"
```

```
1730 DISP "PRESS KEY K8 TO END PROGRAM"
1735 DISP "PRESS KEY K14 TO CONTINUE MEASUREMENTS"
1740 RETURN
1750 REM ALL ERRORS TO BE PLOTTED !
1760 DISP "THIS PROGRAM IS NOT YET COMPLETE "
1770 DISP "PRESS CONT TO RETURN TO OPTION SELECTION"
1780 PAUSE
1790 GOTO 970
1800 DISP "CALCULATING, PLEASE WAIT FOR APPROX 1 MINUTE"
1810 FOR I=3 TO 357
1820 L2(I)=(-(1*L1(I+2))+8*L1(I+1)-8*L1(I-1)+1*L1(I-2))/(12*D)
1830 L3(I)=(-(1*L1(I+2))+16*L1(I+1)-30*L1(I)+16*L1(I-1)-1*L1(I-2))/(12*D*D)
1840 NEXT I
1850 CSIZE 3 @ SETGU @ PEN 3 @ P=0 @ LORG 5
1860 YAXIS 10,10,10,90
1870 FOR I=10 TO 90 STEP 10
1880 MOVE 6,I @ LABEL (-4+P)*.1
1890 P=P+1
1900 NEXT I
1910 LDIR 90 @ MOVE 5,85 @ LORG 1 @ LABEL "(dL\dA)"
1920 LDIR 0
1930 SETUU
1940 SCALE -180,180,-.4,.4
1950 CSIZE 3 @ LORG 1
1960 MOVE 95,.3 @ DRAW 115,.3
1970 MOVE 120,.3 @ LABEL "VELOCITY PLOT"
1980 XAXIS 0
1990 FOR I=3 TO 357
2000 PLOT A1(I),L2(I)
2010 NEXT I
2020 PEN 4 @ LORG 2 @ SETGU @ N=0
2030 YAXIS 140,8,10,90
2040 FOR I=10 TO 90 STEP 8
2050 MOVE 143,I @ LABEL -5+N
2060 N=N+1
2070 NEXT I
2080 LDIR 90 @ MOVE 146,80 @ LORG 3 @ LABEL "(d^2L\dA^2)"
2090 LDIR 0 @ LORG 1
2100 SETUU @ LORG 1
2110 SCALE -180,180,-5,5
2120 MOVE 95,4 @ DRAW 115,4
2130 MOVE 120,4 @ LABEL "ACCELERATION PLOT"
2140 FOR J=3 TO 357
2150 PLOT A1(J),L3(J)
2160 NEXT J
2170 PEN UP @ PEN 0 @ GOTO 970
2180 CLEAR @ DISP "HAVE YOU CHANGED PLOTTING PAPER?"
2190 DISP "PRESS CONT IF YOU ARE READY"
2200 PAUSE
2210 DISP "CALCULATING"
2220 FOR I=1 TO 360
2230 L4(I)=L1(I)-L5(I)
2240 NEXT I
2250 PLOTTER IS 705 @ CSIZE 3
2260 FRAME
2270 LOCATE 20,130,10,90 @ FXD 0,3
2280 SCALE -180,180,-.01,.01
2290 LAXES -10,.001,0,0,3,2
2300 CSIZE 5 @ LORG 4 @ LDIR 0
2310 MOVE 0,.011 @ LABEL "ERROR PROFILE PLOT (";G$;")"
2320 LDIR 90 @ CSIZE 3 @ MOVE -210,.008 @ LABEL "(ins)"
2330 LORG 1 @ LDIR 0
2340 MOVE 30,.008 @ LABEL "ANGLE OF PEAK FROM ZERO DATUM = ";M$;" Deg"
2350 PEN 2
2360 FOR I=1 TO 360
2370 PLOT A2(I),L4(I)
2380 NEXT I
2390 LIMIT 90,150,165,225
2400 SHOW -40,40,-40,40 @ PEN 1
2410 XAXIS 0 @ YAXIS 0
2420 BEEP @ GCLEAR
2430 DISP "PLEASE WAIT FOR APPROX 1 MIN WHILST FURTHER CALCULATIONS ARE DONE"
```

```
2440 DISP "PLOTTING IS NOT YET FINISHED!"
2450 BEEP
2460 FOR I=0 TO 359
2480 X2(I+1)=X(I+1)+(2500*(-L1(I+1)+L5(I+1)))*SIN (I) @ Y2(I+1)=Y(I+1)+(2500*(-
L1(I+1)+L5(I+1)))*COS (I)
2490 NEXT I
2500 X2(361)=X2(1) @ Y2(361)=Y2(1)
2505 BEEP @ BEEP @ GCLEAR @ DISP "PLOTTING"
2510 PEN 3
2520 FOR I=1 TO 361
2530 PLOT X(I),Y(I)
2540 NEXT I
2550 PEN 4
2560 FOR I=1 TO 361
2570 PLOT X2(I),Y2(I)
2580 NEXT I
2590 LIMIT 12,392,9,259 @ PEN 0
2600 GOTO 970
2610 PRINT "        CAMSHAFT MEASUREMENT RESULTS (";G$;")"
2620 PRINT
2630 FOR I=1 TO 90
2640 AN1(I)=A1(I) @ LF1(I)=L1(I)
2650 NEXT I
2660 FOR I=91 TO 180
2670 AN2(I-90)=A1(I) @ LF2(I-90)=L1(I)
2680 NEXT I
2690 FOR I=181 TO 270
2700 AN3(I-180)=A1(I) @ LF3(I-180)=L1(I)
2710 NEXT I
2720 FOR I=271 TO 360
2730 AN4(I-270)=A1(I) @ LF4(I-270)=L1(I)
2740 NEXT I
2750 FOR I=1 TO 90
2760 PRINT USING 2770 ; AN1(I),LF1(I),AN2(I),LF2(I),AN3(I),LF3(I),AN4(I),LF4(I)
2770 IMAGE S3D,2X,D.5D,4X,S3D,2X,D.5D,4X,S3D,2X,D.5D,4X,S3D,2X,D.5D
2780 NEXT I
2790 PRINT
2800 PRINT "ANGLE OF PEAK FROM ZERO DATUM=";M$
2810 GOTO 970
5000 FOR I=1 TO 16
5010 READ K$(I)
5020 NEXT I
5030 DATA CAM1,CAM2,CAM3,CAM4,CAM5,CAM6,CAM7,CAM8,CAM9,CAM10,CAM11,CAM12,CAM13,C
AM14,CAM15,CAM16
5040 DISP "ENTER DATE REFERENCE OF CAM MEASUREMENT"
5050 DISP "FOR EXAMPLE, A CAM MEASURED ON 28-10-82 WOULD BE 28102 AND 1-6-82 WOU
LD BE 01062"
5060 INPUT D$
5070 FOR I=1 TO 16
5080 K1$(I)=D$&K$(I)
5090 DISP K1$(I)
5100 MASS STORAGE IS ":D701"
5110 ASSIGN£ 1 TO K1$(I)
5120 READ£ 1,361 ; C$(I)
5130 C(I)=VAL (C$(I))
5140 ASSIGN£ 1 TO *
5150 NEXT I
5160 REM INLET VALVES !
5170 PRINT USING 5180 ; "INLET VALVE ANGULAR ERRORS (",D$,")"
5180 IMAGE 19X,28A,5A,1A,//
5190 PRINT USING 5200 ; "CAM","ACTUAL","ERROR"
5200 IMAGE 20X,3A,14X,6A,7X,5A
5210 IF C(4)<C(1) THEN B1=C(4)-C(1)+227 ELSE B1=C(4)-C(1)-133
5220 PRINT USING 5410 ; "(C1 A1) LEADS B1",B1+133,B1
5230 IF C(13)<C(4) THEN A4=C(13)-C(4)+43 ELSE A4=C(13)-C(4)-317
5240 PRINT USING 5410 ; "(C4 B1) LEADS A4",A4+317,A4
5250 IF C(16)<C(13) THEN B4=C(16)-C(13)+227 ELSE B4=C(16)-C(13)-133
5260 PRINT USING 5410 ; "(C13 A4) LEADS B4",B4+133,B4
5270 IF C(8)<C(16) THEN B2=C(8)-C(16)+315 ELSE B2=C(8)-C(16)-45
5280 PRINT USING 5410 ; "(C16 B4) LEADS B2",B2+45,B2
5290 IF C(9)<C(8) THEN A3=C(9)-C(8)+43 ELSE A3=C(9)-C(8)-317
5300 PRINT USING 5410 ; "(C8 B2) LEADS A3",A3+317,A3
5310 IF C(12)<C(9) THEN B3=C(12)-C(9)+227 ELSE B3=C(12)-C(9)-133
```

```
5320 PRINT USING 5410 ; "(C9 A3) LEADS B3",B3+133,B3
5330 IF C(5)<C(12) THEN A2=C(5)-C(12)+43 ELSE A2=C(5)-C(12)-317
5340 PRINT USING 5410 ; "(C12 B3) LEADS A2",A2+317,A2
5350 IF C(1)<C(5) THEN A1=C(1)-C(5)+315 ELSE A1=C(1)-C(5)-45
5360 PRINT USING 5410 ; "(C5 A2) LEADS A1",A1+45,A1
5370 REM EXHAUST VALVES !
5380 PRINT
5390 PRINT USING 5400 ; "EXHAUST VALVE ANGULAR ERRORS"
5400 IMAGE 19X,28A,//
5410 IMAGE 14X,17A,4X,S3D.DDD,4X,S3D.DDD,/
5420 IF C(3)>C(2) THEN A1=C(2)-C(3)+227 ELSE A1=C(2)-C(3)-133
5430 PRINT USING 5410 ; "(C3 A1) LEADS B1",A1+133,A1
5440 IF C(2)>C(15) THEN B1=C(15)-C(2)+43 ELSE B1=C(15)-C(2)-317
5450 PRINT USING 5410 ; "(C2 B1) LEADS A4",B1+317,B1
5460 IF C(15)>C(14) THEN A4=C(14)-C(15)+227 ELSE A4=C(14)-C(15)-133
5470 PRINT USING 5410 ; "(C15 A4) LEADS B4",A4+133,A4
5480 IF C(14)>C(6) THEN B4=C(6)-C(14)+315 ELSE B4=C(6)-C(14)-45
5490 PRINT USING 5410 ; "(C14 B4) LEADS B2",B4+133,B4
5500 IF C(6)>C(11) THEN B2=C(11)-C(6)+43 ELSE B2=C(11)-C(6)-317
5510 PRINT USING 5410 ; "(C6 B2) LEADS A3",B2+317,B2
5520 IF C(11)>C(10) THEN A3=C(10)-C(11)+227 ELSE A3=C(10)-C(11)-133
5530 PRINT USING 5410 ; "(C11 A3) LEADS A2",A3+133,A3
5540 IF C(10)>C(7) THEN B3=C(7)-C(10)+43 ELSE B3=C(7)-C(10)-317
5550 PRINT USING 5410 ; "(C10 B3) LEADS A2",B3+317,B3
5560 IF C(7)>C(3) THEN A2=C(3)-C(7)+315 ELSE A2=C(3)-C(7)-45
5570 PRINT USING 5410 ; "(C7 A2) LEADS A1",A2+45,A2
5580 IF C(3)>C(1) THEN ERR=C(1)-C(3)+249 ELSE ERR=C(1)-C(3)-111
5590 PRINT
5600 PRINT USING 5610 ; "A1 EXHAUST LEADS A1 INLET BY ";ERR
5610 IMAGE 15X,29A,SD.DDD
5620 PRINT
5630 PRINT USING 5640 ; "ALLOWABLE ANGULAR ERROR +/-0.5 DEG"
5640 IMAGE 15X,34A
5650 GOTO 970
7000 END
```

What I claim is:

1. A method of checking the profile of an element including the steps of:
   advancing a detection head up to the element,
   determining a reference point on the profile of said element from which movement from said point may be determined;
   producing continuous relative movement between the detection head and the element;
   continuously taking profile readings from the reference point along the profile of said element;
   feeding said readings at selected spaced time intervals to a computing means;
   storing ideal element profile data in said computing means; and
   determining the error in element shape from said profile readings and said stored ideal element shape.

2. A method of checking the profile of an element as claimed in claim 1 in which continuous relative rotary movement is produced between the detection head and the element.

3. A method of checking the profile of an element as claimed in claim 2 in which angular displacement during said rotary movement is recorded in steps.

4. A method of checking the profile of an element as claimed in claim 1 in which the profile of said element is plotted from the signals fed to said computer means.

5. The method of claim 4 in which both the profile of the element and the profile of the ideal element is plotted with respect to one another.

6. The method of checking the profile of an element of claim 1 wherein the profile to be checked is that of a cam.

7. A method of checking the profile of an element as claimed in claim 6 in which said computing means generates velocity and acceleration data based on the profile of said element; and plotting said velocity and accelerating data from said generated velocity and acceleration data.

8. An apparatus for checking the profile of an element comprising:
   a support;
   a transducer for producing a signal in accordance with the profile of said element;
   a drive associated with the support for producing continuous relative movement between said element being checked and said transducer;
   means for feeding signals from said transducer to a means for computing data;
   means in said computing means for determining a reference point on the profile of said element from which movement may be determined;
   storing in said computing means data corresponding to the ideal profile of said element; and
   means in said computing means for determining the error in form of said profile of said element from said profile readings and said stored ideal element data.

9. Apparatus for checking the profile of an element as claimed in claim 8 in which the drive is a rotary drive.

10. Apparatus for checking the profile of an element as defined in claim 9 in which a rotary encoder is provided to record angular displacement in discrete steps.

11. Apparatus for checking the profile of an element as claimed in claim 10 in which the transducer and rotary encoder are connected to respective digital read out means; and interface means for connecting the output of said digital read out means to said computing means.

12. Apparatus for checking the profile of an element as defined in claim 11 wherein said element is a cam and wherein one digital read out means provides a continuous read out of the lift measured by the transducer and the other digital read out means provides a continuous read out of the angle measured by said rotary encoder.

13. The apparatus for checking the profile of an element as claimed in claim 10 wherein said element is a cam and wherein said supports are provided with a shaft for carrying said cam, one of said supports being movable to accommodate shafts of differing length.

14. Apparatus for checking the profile of an element as defined in claim 10 in which a plotter is connected to said computer.

* * * * *